United States Patent
D'Aleo et al.

(10) Patent No.: US 6,562,506 B1
(45) Date of Patent: May 13, 2003

(54) FUEL-CELL SYSTEM WITH A PIVOTABLE STACK INSTALLATION ASSEMBLY

(75) Inventors: James M. D'Aleo, Clifton Park, NY (US); Michael M. Walsh, Fairfield, CT (US)

(73) Assignee: Plug Power, LLC, Latham, NY (US)

( * ) Notice: Subject to any disclaimer, the term of this patent is extended or adjusted under 35 U.S.C. 154(b) by 112 days.

(21) Appl. No.: 09/702,708

(22) Filed: Oct. 31, 2000

(51) Int. Cl.[7] .................. H01M 8/00; H01M 2/00; H01M 2/02; H01M 2/08
(52) U.S. Cl. .................. 429/34; 429/13; 429/37
(58) Field of Search .................. 429/13, 34, 37

(56) References Cited

U.S. PATENT DOCUMENTS 4,431,714 A * 2/1984 Myerhoff .................. 429/26

FOREIGN PATENT DOCUMENTS

| JP | 62-115673 | * | 5/1987 | ............ H01M/8/24 |
| JP | 2002-190312 | * | 7/2002 | ............ H01M/8/24 |

* cited by examiner

Primary Examiner—Patrick Ryan
Assistant Examiner—Julian Mercado
(74) Attorney, Agent, or Firm—Fish & Richardson PC

(57) ABSTRACT

In a fuel-cell system, the task of replacing a fuel-cell stack mounted on a base is made easier by a hinge coupling the fuel-cell stack and the base. The hinge enables the stack to be pivoted onto the base so that an aperture on the stack aligns with a corresponding aperture on the base.

33 Claims, 9 Drawing Sheets

FUEL-CELL SYSTEM WITH A PIVOTABLE STACK INSTALLATION ASSEMBLY

This invention relates to fuel-cell systems, and in particular, to the replacement of fuel stacks in fuel-cell systems.

BACKGROUND

A fuel cell converts chemical energy to electrical energy by promoting a chemical reaction between two reactants. In a typical fuel cell, a hydrogen source is placed in contact with one side of a membrane and an oxygen source is placed on the other side of the membrane. The membrane is selected to be permeable to protons but not to electrons. A catalyst, such as platinum, coats the membrane and facilitates the passage of protons across it.

In operation, hydrogen atoms on one side of the membrane decompose into protons and electrons. The protons pass through the membrane but the electrons cannot. This results in the formation of a modest electrical potential across the membrane. To provide a system with increased voltage and higher output, a number of these fuel cells may be connected in series. The resulting structure, in which the membranes appear to be stacked one on top of the other, is referred to as a "stack."

To generate power, the stack must be provided with a flow of reactants, or fuel. In addition, heat generated by the reaction may be removed by a coolant to maintain a desired temperature. The fuel may be provided by, for example, a fuel processor that converts a hydrocarbon (such as natural gas or methanol) into a hydrogen-rich reformate. Inlet and outlet streams for air, fuel and coolant are plumbed to the stack.

SUMMARY

A typical stack can be heavy and unwieldy, making installation and removal for service difficult. For example, a 7 kW stack assembly containing eighty fuel cells using carbon composite flow field plates may weigh more than one hundred pounds. During installation, it may be necessary to place such a stack in a confined space within the fuel cell system while ensuring accurate placement. Some fuel-cell systems may include a manifold base that a stack can be plugged into or aligned with to simplify plumbing connections to the stack. An example of such a fuel-cell system is described in U.S. patent Ser. No. 09/703,082, entitled "Fuel Cell Coolant Tank System" filed on Oct. 31, 2000 and assigned to Plug Power Inc., the contents of which are hereby incorporated by reference in their entirety. In such systems, accurate placement of the stack during installation can be critical, for example to align and seal the fluid connection apertures of the stack with the fluid connection apertures of the base.

The invention provides a hinge that couples a fuel-cell stack to a base. In some embodiments, the hinge enables a field service technician to pivot the stack onto the base so that a stack-aperture on the stack mates with a base aperture on the base. However, in the context of the invention, the base can refer to any platform or position to which the stack is positioned or installed within the fuel-cell system, regardless of whether the base itself contains fluid connection apertures that mate to the stack.

In one aspect of the invention, a separable hinge includes a first hinge-element attached to a base of a fuel-cell system and a second hinge-element attached to the stack. Using the separable hinge, a field-service technician can mount the stack onto the base by aligning the first and second hinge-elements and then engaging them. Once the first and second hinge-elements are engaged, the hinge is complete and the stack can be pivoted about an axis defined by the hinge. The field service technician can then pivot the stack around this axis and into the correct position on the base.

A fuel-cell system incorporating the invention includes a fuel-cell stack having one or more stack-apertures and a base having one or more base-apertures to be mated with corresponding stack-apertures. A separable hinge attached to both the fuel-cell stack and to the base defines a pivot axis and enables the stack aperture to be pivoted about this pivot axis and into engagement with the base-aperture. The separable hinge defines a first position in which the stack and the base are inseparable and a second position in which the stack and the base are separable.

The separable hinge can include a first hinge-element and a second hinge-element. The second hinge-element is configured to engage the first hinge-element when the fuel-cell stack is at a first position relative to the base, and to disengage from the first hinge-element when the fuel-cell stack is at a second position relative to the base.

In one type of separable hinge, a transition between the first and second positions occurs as the stack is pivoted about the pivot axis. In this type of separable hinge, a pin on the first hinge-element defines the pivot axis. This pin is supported by one or more knuckles that are attached to either the stack or the base. The second hinge-element can then include a curled engagement portion for engaging the pin. The curled engagement portion follows an arc of a circle having a radius-of-curvature corresponding to a radius-of-curvature of the pin.

In another type of separable hinge, transition between first and second positions is effected by translating the stack relative to the base along a direction defined by the separable hinge. In one embodiment of this type of separable hinge, a pin mounted on the first hinge-element defines both a pivot axis and an axis of translation. In this embodiment, the second hinge-element can include a wall that forms a passageway for receiving the pin. The first and second hinge-elements can thus be brought into engagement by sliding the pin through the passageway. Conversely, the first and second hinge-elements can be separated by sliding the pin out of the passageway.

In yet another type of separable hinge, the first hinge-element defines a groove and the second hinge-element includes a spindle configured to be lifted into and out of engagement with the groove. When the spindle rests in the groove, the stack can be rotated into position over the base using a pivot axis defined by the groove.

By providing an axis about which the stack can be pivoted into position, the hinge eliminates the need to align the stack-apertures with the base-apertures. In effect, the task of aligning the stack apertures with the base apertures is replaced by the much easier task of aligning first and second hinge-elements. By supporting a portion of the stack's weight at the time that the stack is being installed, the hinge avoids imposing the entire weight of the stack on a technician during installation, either in the factory or in the field.

As used herein, "hinge" refers to any structures or structural elements that collectively define an axis about which the stack can be pivoted into position on the base. The structures or structural elements included in a hinge can be attached to the base, attached to the stack, or both. Alternatively, the structures or structural elements included in the hinge can be integral with the base, integral with the stack, or integral with both the stack and the base.

Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described below. In addition, the materials, methods, and examples are illustrative only and not intended to be limiting.

These and other features of the invention will be apparent upon examination of the following detailed description, the claims, and the figures, in which:

DETAILED DESCRIPTION

Figure 1:
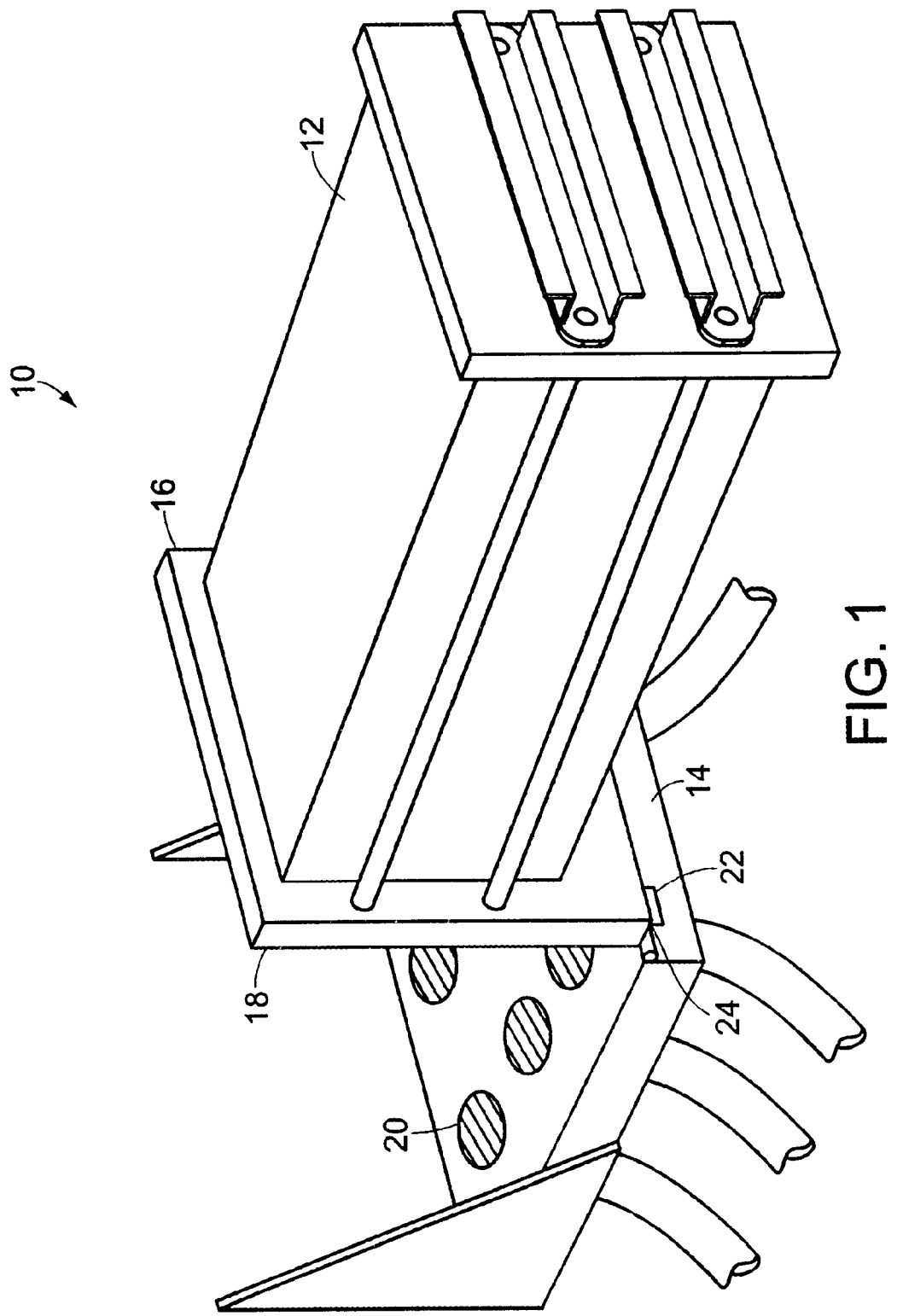
FIG. 1 shows a fuel-cell system with a stack mounted on a base.

FIG. 1 shows a fuel-cell system 10 that includes a stack 12 and a base 14. The base 14 houses a reconditioning unit whose function is to supply reactants to the fuel cells in the stack 12. The stack 12 has a service end 16 having apertures 18 for receiving reactants and coolant from corresponding apertures 20 in the base 14.

A first hinge-element 22 attached to the base 14 defines an axis of rotation about which the stack 12 can be pivoted into position on the base 14. The first hinge-element 22 is adapted to engage a second hinge-element 24 mounted on the service end 16 of the stack 12. The first and second hinge-elements 22, 24 are shown in more detail in FIG. 2.

Figure 2:
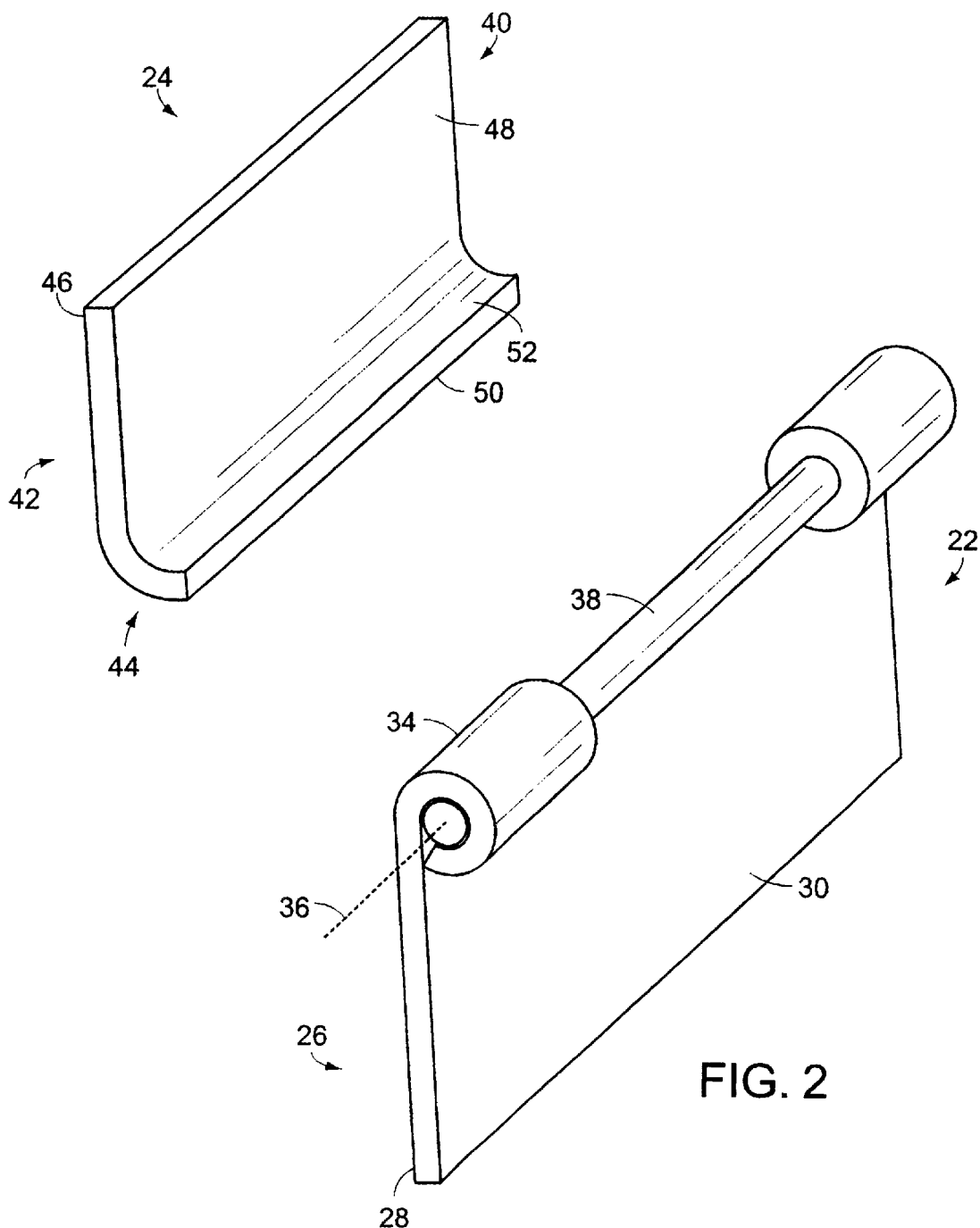
FIG. 2 shows the two hinge-elements that form a separable hinge in the fuel-cell system of FIG. 1.

The first hinge-element 22 includes a base-attachment wing 26 having a flat inner face 28 seated against the base 14 and an exposed flat outer face 30 opposite and parallel to the inner face 28. The inner and outer faces 28, 30 of the base-attachment wing 26 are joined to a top edge from which a plurality of knuckles 34 protrude. These knuckles 34, two of which are shown in FIG. 2, are integral to the base-attachment plate 26 and are outwardly curled along a circular path in a plane perpendicular to the plane of the base-attachment plate 26. Each of the knuckles 34 thus defines a passageway having a circular transverse cross-section. In addition, the individual knuckles 34 are aligned so that a common pivot axis 36 passes through the center of the passageway defined by each knuckle 34. The pivot axis 36 is thus parallel to the base-attachment wing's top edge and separated from the base-attachment wing's outer face 30 by the radius-of-curvature of the circular path.

The first hinge-element 22 also includes a cylindrical pin 38 having a pin radius that is slightly smaller than the radius-of-curvature of the circular path. The pin radius is small enough so that the pin 38 can be passed through the passageways defined by the knuckles 34 but not so small that the pin axis, once the pin 38 is seated on the knuckles 34, departs appreciably from being coincident with the pivot axis 36.

The second hinge-element 24 includes a stack-attachment wing 40 having an attachment portion 42 and an engagement portion 44 that is integral with the attachment portion 42. The attachment portion 42 includes a flat inner-face 46 that is seated against the stack 12 and an exposed flat outer-face 48 opposite the flat inner-face 46. Where the attachment portion 42 and the engagement portion 44 meet, the inner and outer faces 46, 48 of the attachment portion 42 curl outwards, away from the stack 12, so that they merge into outer and inner surfaces 50, 52 respectively of the engagement portion 44. The inner surface 52 of the engagement portion 44 follows a circular arc having a radius-of-curvature that matches the radius-of-curvature of the circular path defined by the knuckles 34 of the first hinge-element 22.

In one embodiment, the base 14 has two first hinge-elements that are aligned so as to have a common pivot axis. In such a case, the stack 12 has two second hinge-elements that are aligned to engage the two first hinge-elements on the base 14. The presence of two hinge-elements on the stack 12 and two corresponding hinge-elements on the base is advantageous because it enables the weight of the stack 12 to be distributed over more weight-bearing elements. In addition, once the hinge-elements are engaged with each other, the movement of the stack 12 is limited to rotation about the common pin-axis. This enables the apertures on the bottom of the stack 12 to be more easily aligned with the corresponding apertures in the manifold on the base 14.

As shown in FIG. 1, the stack 12 has one dimension that is much longer than its other two dimensions. This longer dimension defines a stack axis that extends longitudinally along this dimension. In the following discussion, the stack 12 will be referred to as being horizontal when its stack axis is parallel to a floor on which the base 14 is mounted. The stack 12 will be referred to as vertical when its stack axis is perpendicular to the floor on which the base 14 is mounted.

The following discussion describes in detail the process of engaging the first hinge-element 22 on one side of the base 14 with the second hinge-element 24 on a corresponding side of the stack 12. It is understood that other pairs of hinge-elements are engaged in the same way.

Figure 3:
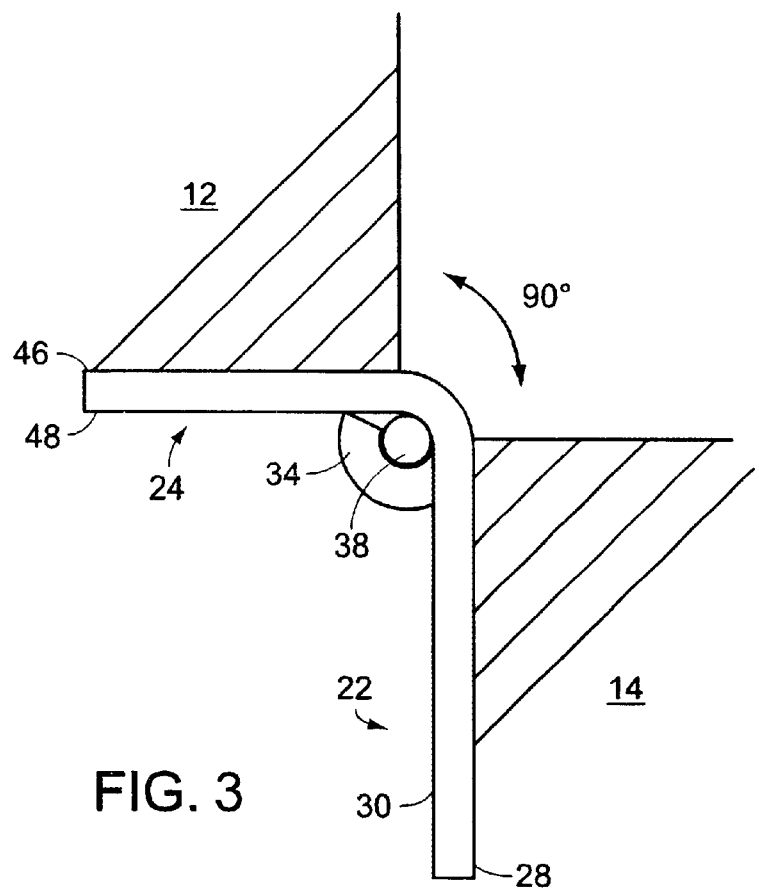
FIG. 3 shows the separable hinge of FIG. 2 in its unlocked position.

To place the stack 12 on the base 14, the stack 12 is first carried horizontally toward the base 14 with the service end 16 of the stack 12 closest to the base 14. The stack 12 is then positioned so that the inner surface 52 of the engagement portion 44 of the second hinge-element 24 rests on the pin 38 that passes through the knuckles of the first hinge-element. FIG. 3 shows a cross-section of the first and second hinge-elements 22, 24 in this position.

Figure 4:
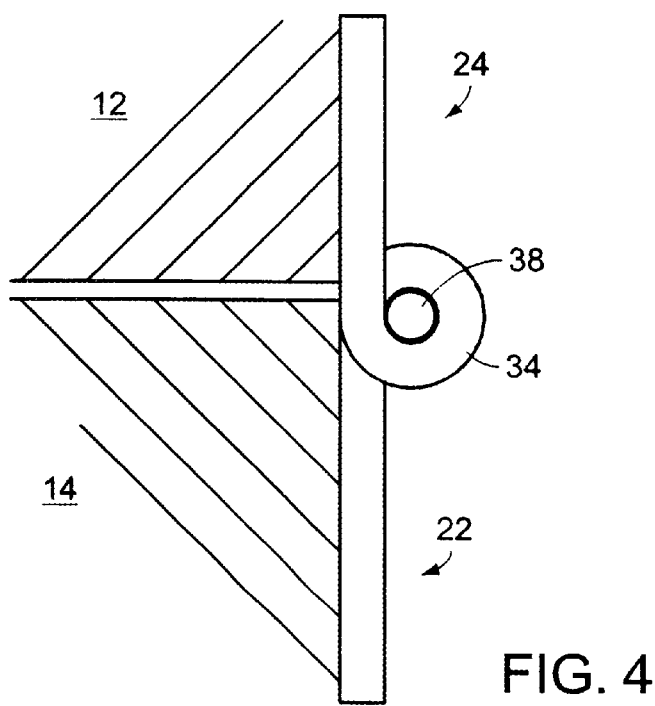
FIG. 4 shows the separable hinge of FIG. 2 in its locked position.

Once the first and second hinge-elements 22, 24 are engaged, as shown in FIG. 3, the stack 12 is pivoted about the pin 38 until the bottom surface of the stack 12 and the top surface of the base 14 meet, as shown in FIG. 4. In this position, the apertures in the bottom surface of the stack 12 engage the corresponding apertures in the manifold on the top surface of the base 14.

As shown in FIGS. 3 and 4, the circular arc defined by the engagement portion 44 of the second hinge-element 24 extends ninety degrees. As a result, when the angle between the top surface of the base 14 and the bottom surface of the stack 12 is ninety degrees or greater, application of an upward force on the stack 12 causes the engagement portion 44 to lift off the pin 38. When the angle is less than ninety degrees, application of an upward force on the stack 12 is resisted by a downward force exerted by the pin 38 on the inner surface 52 of the engagement portion 44. The hinge thus formed by the engagement of the first and second hinge-elements 22, 24 is a separable hinge having a first range of positions in which the two hinge-elements 22, 24 are freely separable and a second range of positions in which the two hinge-elements 22, 24 are locked together.

The separable hinge formed by the engagement of the first and second hinge-elements 22, 24 thus eases the task of installing a replacement stack 12 in the fuel-cell system 10. Using the separable hinge, it is only necessary to engage the hinge-elements 24 on the stack 12 with corresponding hinge-elements 22 on the base 14. Once the hinge-elements 22, 24 are engaged, the stack 12 can be pivoted upright into its final position. By properly aligning the hinge-elements 22, 24 on the base 14, the final position of the stack 12 can be such as to align the apertures on the stack 12 with the corresponding apertures on the base 14.

Figure 5:
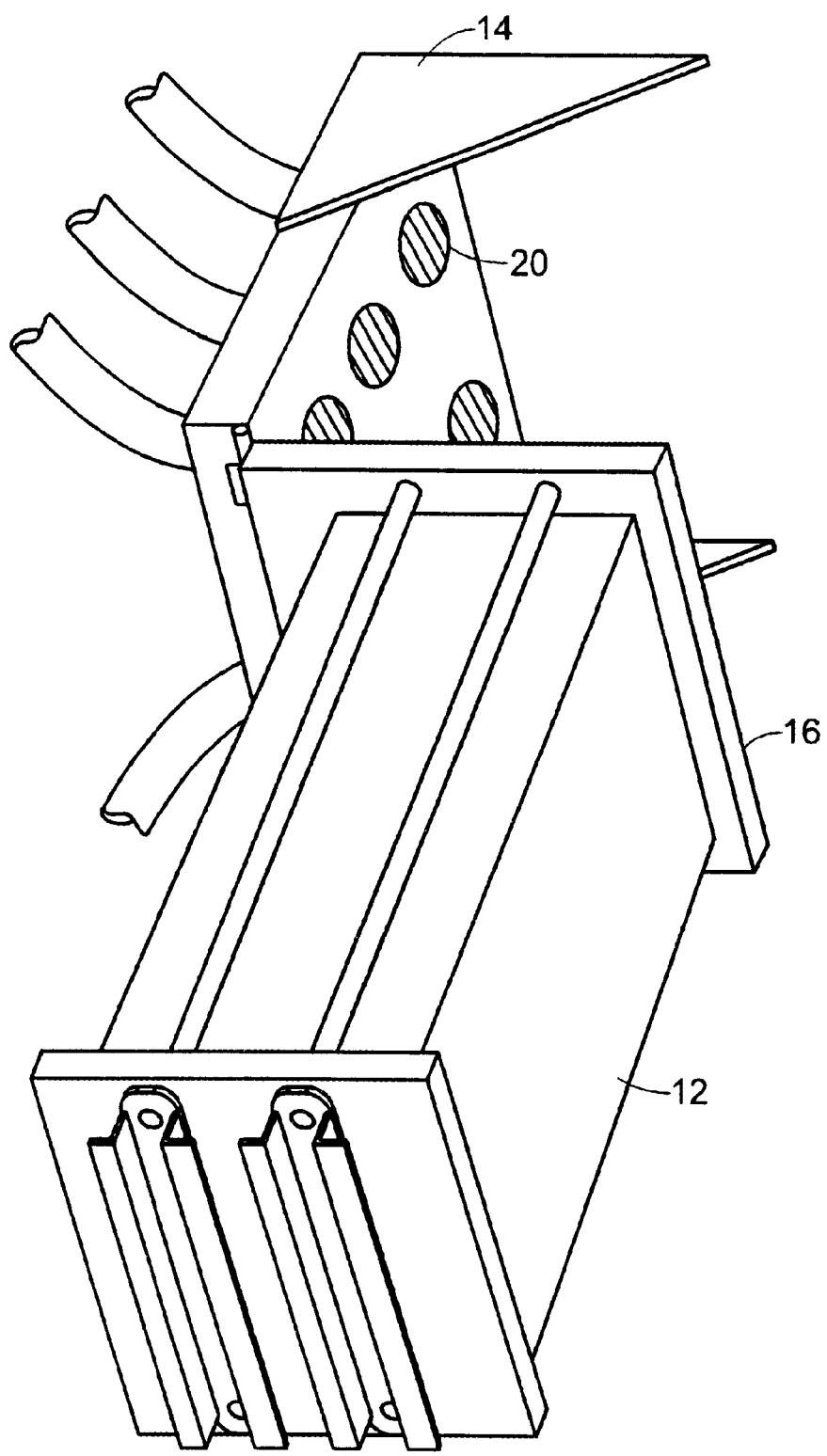
FIG. 5 shows a fuel-cell system in which a stack is mounted horizontally.
Figure 6:
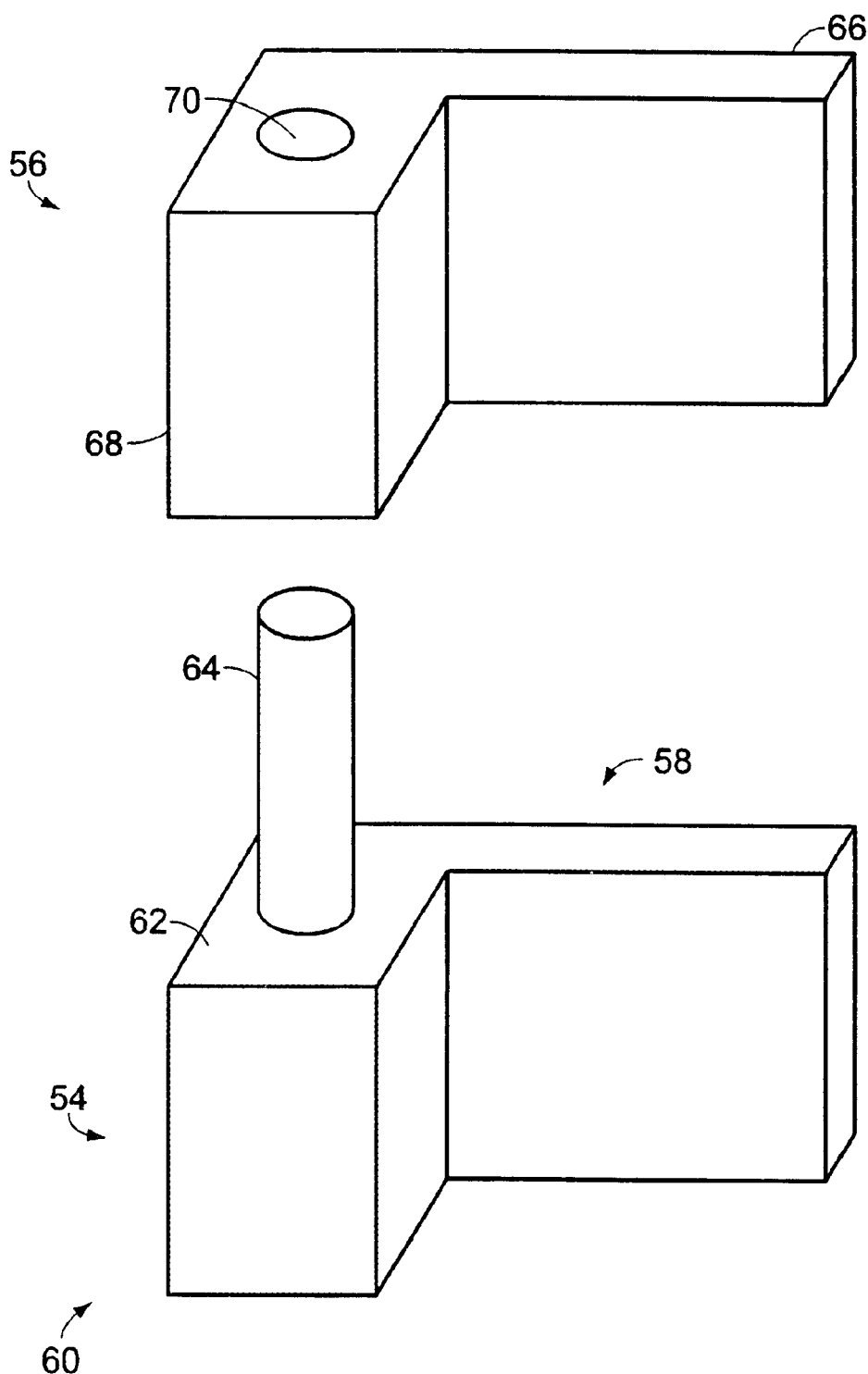
FIG. 6 shows a separable hinge for use with the fuel-cell system of FIG. 5.

Other types of separable hinges can be used for transforming the act of aligning apertures on the stack 12 with apertures on the base into the sequential acts of aligning hinges on the stack 12 with hinges on the base 14 followed by pivoting the stack 12 into position. In the embodiment shown in FIG. 5, the fuel-cell system 10 is configured so that the stack 12 extends horizontally from the base 14 instead of vertically from the base 14 as shown in FIG. 1. For this configuration, the separable hinge shown in FIGS. 2–4 may not practical. Under these circumstances, a separable hinge formed by first and second hinge-elements 54, 56 as shown in FIG. 6 can be used.

The first hinge-element 54 includes a base wing 58 having a flat surface for attachment to the base 14 and an engagement wing 60 protruding from the base wing 58. The engagement wing 60 has a load-bearing surface 62 from which a cylindrical pin 64 extends upwards. As shown in FIG. 6, the engagement wing 60 is integral with the base wing 58 and protrudes from an end of the base wing 58. However, this particular geometry is not required.

The second hinge-element 56 includes a stack wing 66 having a flat surface for attachment to the stack 14 and an engagement wing 68 having a cylindrical passageway 70 for receiving the pin 64. The passageway 70 has a diameter that is large enough to be able to easily receive the pin 64 but small enough to hold the axis of the pin 64 coincident with the axis of the passageway 70.

To place the stack 12 on the base 14, the stack 12 is first carried horizontally toward the base 14 with the service end 16 of the stack 12 closest to the base 14. The stack 12 is then positioned so that passageway 70 is directly above the pin 64. The stack 12 is then lowered so that the pin 64 penetrates into the passageway 70 and the stack 12 rests on the load-bearing surface 62.

Once the first and second hinge-elements 54, 56 are engaged, the stack 12 is pivoted about the pin 64 until the bottom surface of the stack 12 and the side surface of the base 14 meet. In this position, the apertures in the bottom surface of the stack 12 engage the corresponding apertures in the manifold on the side surface of the base 14.

To provide additional stability, an additional pair of first and second hinge-elements is aligned so that the pin axes of both pairs of hinge-elements are aligned. The structure and operation of the second pair of first and second hinge-elements is identical to that of the first pair of hinge-elements.

The hinge that couples the base 14 to the stack 12 can have any length. For example, in FIG. 7, the hinge has a first hinge-element 22 that extends along one edge of the base 14 and a second hinge-element 24 that extends along a corresponding edge of the stack 12. An extended hinge of the type shown in FIG. 7 is advantageous because the weight of the stack 12 is supported across a greater area, thereby reducing the stress that would be experienced by one or more shorter hinges.

Figure 7:
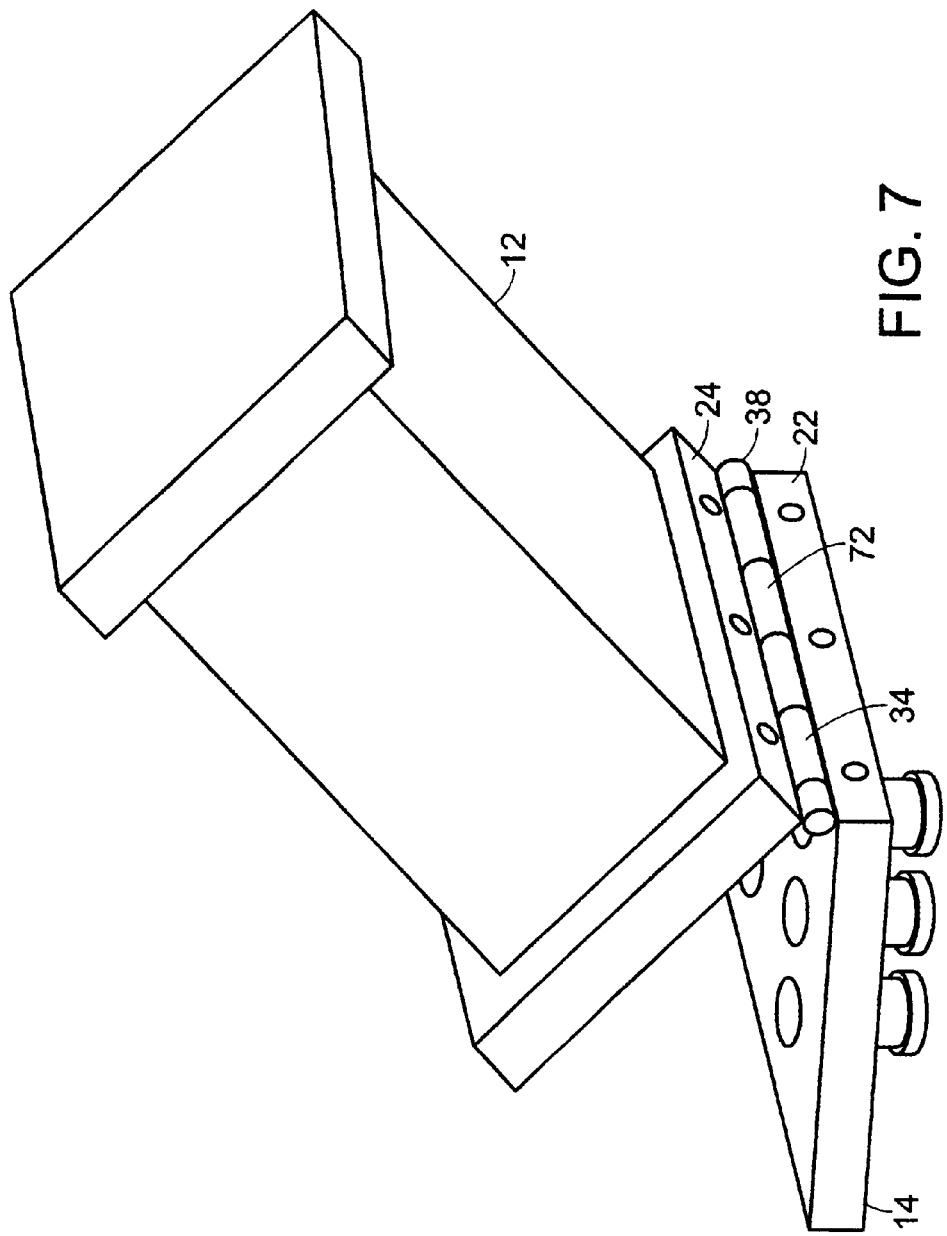
FIG. 7 shows a fuel-cell system with a stack mounted on a base by an extended hinge.

In the embodiment of FIG. 7, the first hinge-element 22 includes a first plurality of knuckles 34 and the second hinge-element 24 includes an engagement portion 44 having a second plurality of knuckles 72. This offset permits the first and second plurality of knuckles 34, 72 to interdigitate when brought into alignment. When aligned, the first and second plurality of knuckles 34, 72 define a cylindrical passageway for receiving a cylindrical pin 38.

To mount the stack 12 on the base 14 in the embodiment of FIG. 7, the service end 16 of the stack 12 is brought to the base 14 and aligned so that the first and second plurality of knuckles 34, 72 interdigitate. Then, the pin 38 is slid into the passageway defined by the interdigitated first and second plurality of knuckles 34, 72. Once the pin 38 is seated in the passageway, it defines an axis 36 about which the stack 12 is pivoted onto the base 14.

Figure 8:
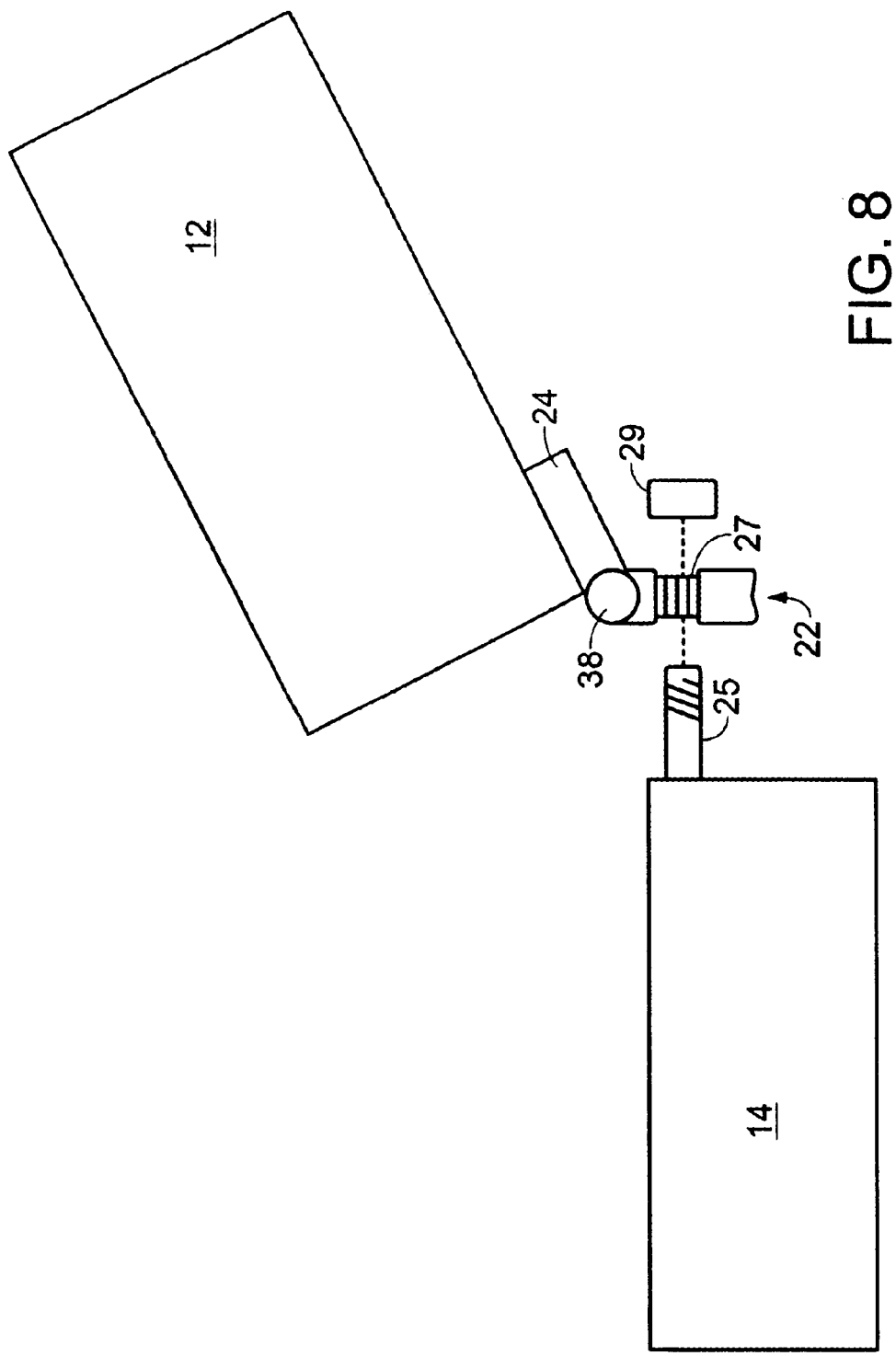
FIG. 8 shows the attachment of the extended hinge of FIG. 7 to the base.

The hinge can couple the stack 12 and the base 14 in a variety of ways. In the example, shown in FIG. 8, the base 14 can include a plurality of protrusions, which engage a corresponding plurality of holes in the second hinge-element 24. An example of such a plurality of protrusions includes a plurality of threaded cylindrical members 25 protruding from the base 14 that are passed through corresponding holes 27 in the first hinge-element 22. In such a case, once the threaded cylindrical members 25 pass through their corresponding holes 27, a corresponding plurality of threaded nuts 29 or caps can be used to secure the stack 12 to the base 14. With the hinge now pivotably coupling the stack 12 and base 14, the stack 12 can be pivoted into position on the base 14. An advantage of the foregoing embodiment is that it may be easier to align the holes in the first hinge-element 22 with protrusions from the base 14 than it is to slide the pin 38 into the cylindrical passageway formed by the interdigitating first and second plurality of knuckles 34, 72.

It will be appreciated that the foregoing discussion is also applicable to an embodiment in which the protrusions 25 extend from the base 14 instead of from the stack 12 and the holes 27 are formed in the second hinge-element 24 instead of in the first hinge-element 22.

Figure 9:
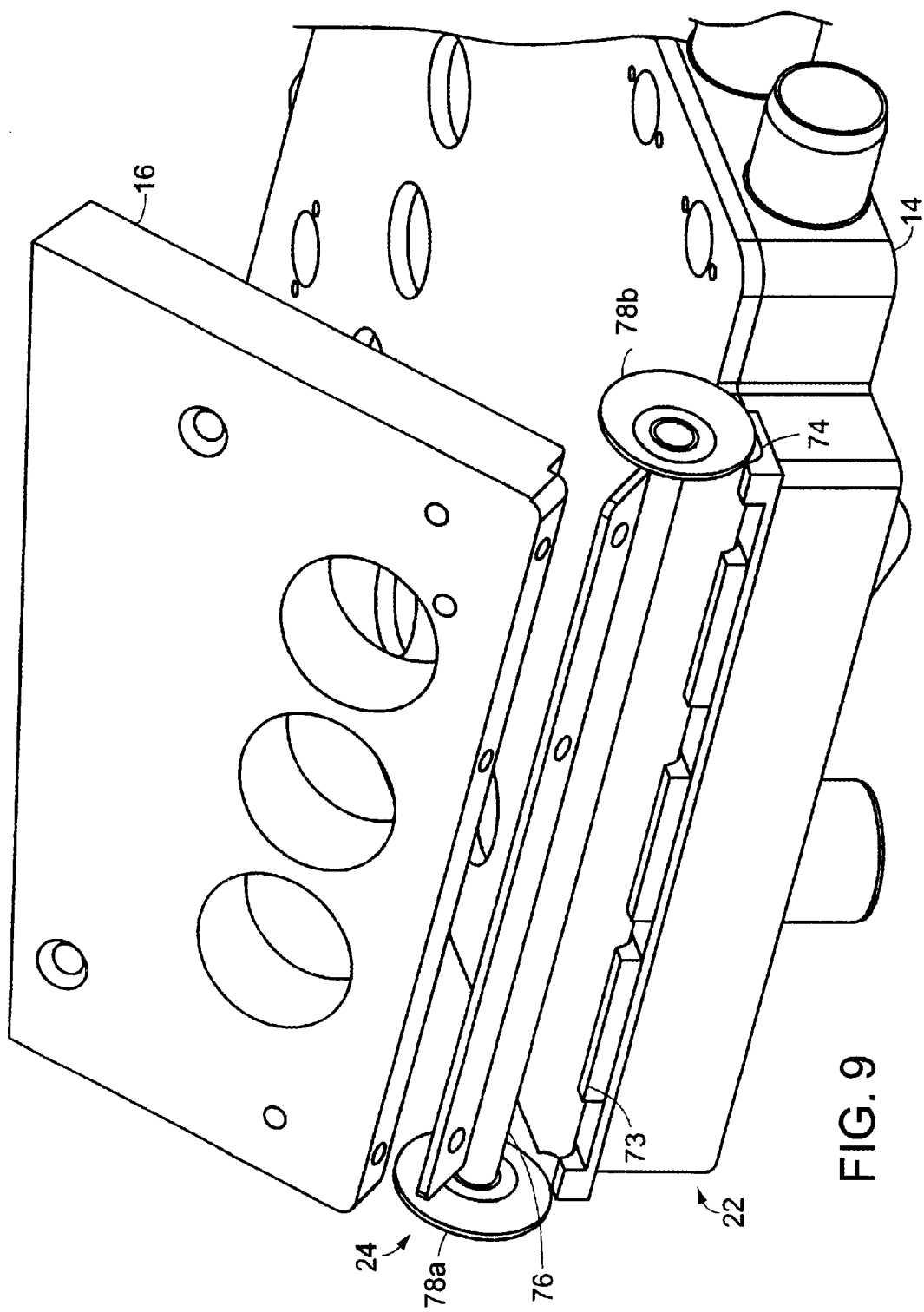
FIG. 9 shows an alternative embodiment of a separable hinge for coupling the base to the stack.
Figure 10:
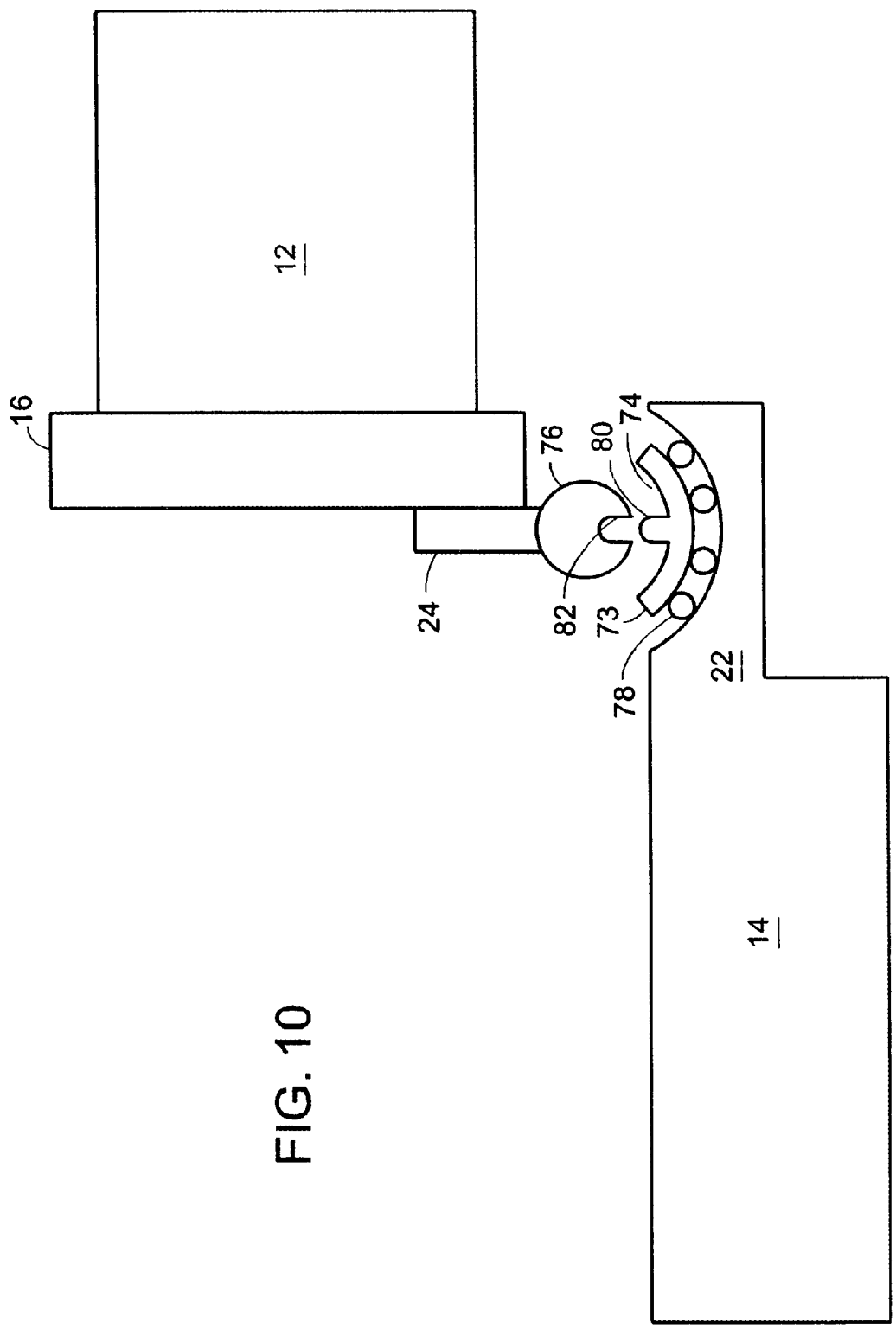
FIG. 10 shows the separable hinge shown in FIG. 9 with mating pegs and apertures.

In another embodiment of a hinge, shown in FIG. 9, the first hinge-element 22 includes a wall 73 forming a semi-circular groove 74 extending axially along an edge of the base 14 and defining the pivot axis. For clarity, FIG. 9 shows only the service end 16 of the stack 12. As shown, the first hinge-element 22 is an integral part of the base 14. However, the first hinge-element 22 can also be a separate structure that is fastened to the base 14.

The engagement portion 44 of the second hinge-element 24 includes a cylindrical spindle 76 having a radius slightly smaller than the radius of curvature of the groove 74. First and second end-caps 78a, 78b attached to first and second ends of the spindle 76 resist translation of the stack 12 along the pivot axis defined by the groove 74. The first and second end-caps 78a, 78b can be frusto-conical structures with bases facing away from the ends of the spindle. The frusto-conical end-caps 78a, 78b are advantageous because they assist in guiding the spindle 76 into engagement with the groove 74.

In one variation of the foregoing embodiment, shown in the cross-sectional view of FIG. 9, the wall 73 forming the groove 74 rests on bearings 78 that allow the wall 73 to rotate about the pivot axis. In this embodiment, the wall 73 has one or more of protruding pegs 80 that are sized and disposed to fit into one or more corresponding apertures 82 in the spindle 76. Alternatively, the pegs 80 could instead protrude from the spindle 76, in which case they would fit into corresponding apertures in the wall 73 forming the groove 74. The addition of pegs 80 and corresponding apertures 82 is further resists translation motion along the pivot axis 36 and assists in aligning the stack 12 to the base 14. In addition, the pegs 80 and their corresponding apertures 82 reduce slippage as the stack 12 is pivoted into position over the base 14.

In the stack-replacement operation, the stack 12, led by its service end 16, is brought to the base 14. The service end 16 is then aligned with the base 14 so that the spindle 76 on the second hinge-element 24 seats into the groove 74 of the first hinge-element 22. If the spindle 76 and groove 74 have pegs 80 and apertures 82, alignment includes aligning the pegs 80 with their corresponding apertures 82. Once the spindle 76 is seated in the groove 74, the stack 12 is pivoted into position on the base 14.

It is apparent that what is common to the foregoing embodiments is the manner a difficult alignment process is transformed into a simpler alignment process followed by a pivoting step. The difficult task of aligning the stack 12 by translating it along the base 14 becomes the simpler task of aligning the stack 12 so that the stack 12 and the base 14 can become pivotably engaged by a hinge. The stack 12 can then be pivoted onto the base 14.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

We claim:

1. A fuel-cell system comprising:
   a fuel-cell stack having a stack-aperture;
   a base having a base-aperture to be mated with said stack aperture; and
   a hinge coupling said fuel-cell stack and said base to enable said stack-aperture to be pivoted into engagement with said base-aperture,
   wherein said hinge is a separable hinge that defines a first position in which said stack and said base are inseparable and a second position in which said stack and said base are separable.

2. The fuel-cell system of claim 1 wherein said hinge comprises:
   a first hinge-element; and
   a second hinge-element, said second hinge-element being configured to engage said first hinge-element when said fuel-cell stack is at a first position relative to said base and to disengage from said first hinge-element when said fuel-cell stack is at a second position relative to said base.

3. The fuel-cell system of claim 2 wherein said first hinge-element is integral with said base.

4. The fuel-cell system of claim 2 wherein said second hinge-element is integral with said stack.

5. The fuel-cell system of claim 2 wherein said first hinge-element is attached to said base.

6. The fuel-cell system of claim 2 wherein said second hinge-element is attached to said stack.

7. The fuel-cell system of claim 1 wherein said hinge is configured such that said fuel-cell stack transitions from said first position to said second position by pivoting about a pivot axis defined by said separable hinge.

8. The fuel-cell system of claim 7 wherein said hinge further comprises:
   a first hinge element comprising a pin defining said pivot axis; and
   a second hinge element, said second hinge element being configured to engage said first hinge element when said fuel-cell stack is at a first position relative to said base and to disengage from said first hinge-element when said fuel-cell stack is at a second position relative to said base.

9. The fuel-cell system of claim 8 wherein said pin is supported by a knuckle attached to said base.

10. The fuel-cell system of claim 8 wherein said pin is supported by a knuckle attached to said fuel-cell stack.

11. The fuel cell system of claim 8 wherein said second hinge-element comprises a curled engagement portion for selectively engaging said pin.

12. The fuel-cell system of claim 11 wherein said curled engagement portion follows an arc of a circle having a radius-of-curvature corresponding to a radius-of-curvature of said pin.

13. The fuel-cell system of claim 12 wherein said arc extends approximately ninety degrees.

14. The fuel-cell system of claim 8 wherein said first hinge element comprises a wall forming a groove extending along a side of said base, said groove defining a pivot axis and said second hinge element comprises a spindle configured to pivot about said pivot axis when engaged in said groove.

15. The fuel-cell system of claim 14 wherein said spindle includes an end-cap disposed at an end of said spindle, said end-cap sized to prevent translation of said spindle along said pivot axis.

16. The fuel-cell system of claim 15 wherein said end-cap is a frusto-conical section having a base surface and a top surface, and said top surface is disposed adjacent to said end of said spindle.

17. The fuel-cell system of claim 15 wherein said end-cap is a frusto-conical section having a base surface and a top surface, and said top surface is disposed adjacent to said end of said spindles.

18. The fuel-cell system of claim 14 wherein said spindle includes an end-cap disposed at an end of said spindle, said end-cap sized to prevent translation of said spindle along said pivot axis.

19. The fuel-cell system of claim 1 wherein said hinge is configured such that said fuel-cell stack transitions from said first position to said second position by translating along an axis defined by said hinge.

20. The fuel-cell system of claim 19 wherein said hinge further comprises:
   a first hinge element comprising a pin defining a pivot axis; and a second hinge element, said second hinge element being configured to engage said first hinge element when said fuel-cell stack is at a first position relative to said base and to disengage from said first hinge-element when said fuel-cell stack is at a second position relative to said base.

21. The fuel-cell system of claim 20 wherein said first hinge-element is mounted on said base.

22. The fuel-cell system of claim 20 wherein said first hinge-element is mounted on said stack.

23. The fuel-cell system of claim 20 wherein said second hinge-element comprises a wall forming a passageway for receiving said pin.

24. The fuel-cell system of claim 23 wherein said wall defines a cylindrical passageway and said second hinge-element is separated from said first hinge-element by translating said first hinge-element and said second hinge-element relative to each other in a direction defined by said pin.

25. The fuel-cell system of claim 1 wherein said hinge comprises a first hinge-element and a second hinge-element engaged with said first hinge-element.

26. The fuel-cell system of claim 25 wherein said first hinge-element comprises a first plurality of knuckles and said second hinge-element comprises a second plurality of knuckles interdigitated with said first plurality of knuckles, and said hinge further comprises a pin disposed in a passageway defined by said first and second pluralities of knuckles.

27. The fuel-cell system of claim 26 further comprising a peg extending from said base and being disposed to pass through a hole in said first hinge-element.

28. A method for mounting a fuel-cell stack on a base, said method comprising:

pivotably coupling said base and said stack with a hinge; and pivoting said stack about an axis defined by said hinge, wherein pivotably coupling said base and said stack comprises engaging a first hinge-element on said base to a second hinge-element on said stack.

29. The method of claim 28 wherein engaging said first hinge-element to said second hinge-element comprises resting said second hinge-element on a pin attached to said first hinge-element.

30. The method of claim 28 wherein engaging said first hinge-element to said second hinge-element comprises causing a pin attached to said first hinge-element to pass through a passageway in said second hinge-element.

31. The method of claim 28 wherein engaging said first hinge-element to said second hinge-element comprises placing a spindle on said second hinge-element on a groove defined by said first hinge-element.

32. The method of claim 28 wherein pivotably coupling said base and said stack with a hinge comprises providing a hinge on said stack, aligning said hinge with said base, and attaching said hinge to said base.

33. The method of claim 28 wherein pivotably coupling said base and said stack with a hinge comprises providing a hinge on said base, aligning said hinge with said stack, and attaching said hinge to said stack.

* * * * *

UNITED STATES PATENT AND TRADEMARK OFFICE
CERTIFICATE OF CORRECTION

PATENT NO. : 6,562,506 B1
DATED : May 13, 2003
INVENTOR(S) : James M. D'Aleo and Michael M. Walsh It is certified that error appears in the above-identified patent and that said Letters Patent is hereby corrected as shown below:

Column 8,
Line 4, replace "spindles" with -- spindle --

Signed and Sealed this

Fourteenth Day of December, 2004

JON W. DUDAS
*Director of the United States Patent and Trademark Office*